(12) United States Patent
Tyroler et al.

(10) Patent No.: US 9,049,307 B2
(45) Date of Patent: Jun. 2, 2015

(54) WIRELESS INTERFACE DEVICE ALLOWING A RELIABLE DIGITAL AND AUDIO COMMUNICATION TRANSFER BETWEEN A SECURITY SYSTEM, POTS AND/OR IP NETWORK MODEM DEVICE

(75) Inventors: Dan Tyroler, Great Neck, NY (US); Robert J. Orlando, Nesconset, NY (US); Ronald K. Rothman, Smithtown, NY (US); Ray Jordan, Holtsville, NY (US); Alfred M. Lizza, Oyster Bay, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1706 days.

(21) Appl. No.: 12/253,736

(22) Filed: Oct. 17, 2008

(65) Prior Publication Data
US 2010/0097210 A1   Apr. 22, 2010

(51) Int. Cl.
*H04M 11/04* (2006.01)
*G01D 21/00* (2006.01)
(Continued)

(52) U.S. Cl.
CPC ............. *H04M 11/04* (2013.01); *G01D 21/00* (2013.01); *G08B 25/10* (2013.01); *H04L 12/2825* (2013.01); *H04L 67/12* (2013.01); *H04W 24/10* (2013.01); *H04W 76/02* (2013.01)

(58) Field of Classification Search
CPC ........... G08B 25/008; G08B 13/19669; G08B 25/14; G08B 29/02; G08B 25/002; G08B 29/00; G08B 3/10; G08B 13/122; G08B 17/10; G08B 21/14; G08B 13/19602; H04M 11/04; H04M 11/045; H04M 2242/04; H04W 76/007; H04W 4/22; H04W 12/12; H04W 64/00; H04N 7/147; H04N 7/181; H04N 7/188

USPC ............ 379/37–49; 455/404.1, 404.2, 456.1, 455/410; 340/506, 541, 628, 632, 540; 348/143, 14.01, 152, 155
See application file for complete search history.

(56) References Cited

U.S. PATENT DOCUMENTS 5,131,019 A   7/1992  Sheffer et al.
5,237,602 A *  8/1993  Lazik .............................. 379/38
(Continued)

OTHER PUBLICATIONS

Tannenbaum, A. S., Computer Networks, 2005, pp. 685-692, 4th Edition, Prentice-Hall.

*Primary Examiner* — Akelaw Teshale
(74) *Attorney, Agent, or Firm* — Husch Blackwell LLP

(57) ABSTRACT

A system, method process and apparatus is presented for interfacing digital and audio communications in a security system, comprising, a control panel having one or more first radio receiver/transceivers and one or more remote alarm sensors coupled to the control panel and the control panel receiving one or more digital reports from each one or more remote alarm sensors, a wireless interface device having one or more second radio receiver/transceivers for receiving the digital reports from the control panel unit and for establishing two-way voice communication between the control panel and the wireless interface unit, one or more telephone units coupled to the wireless interface device for communicating with the wireless interface unit and at least one POTS and/or IP network modem device coupled to the wireless interface device, an IP network, wherein, the wireless interface device includes a communication processing unit for transmitting one or more digital reports to a monitoring service via the POTS and/or IP network and for establishing two-way voice communication between the control panel and the monitoring service via a voice channel connection.

29 Claims, 4 Drawing Sheets

(51) Int. Cl.
  *G08B 25/10* (2006.01)
  *H04L 12/28* (2006.01)
  *H04L 29/08* (2006.01)
  *H04W 24/10* (2009.01)
  *H04W 76/02* (2009.01)

(56) References Cited

U.S. PATENT DOCUMENTS

| | | | |
|---|---|---|---|
| 5,278,888 | A | 1/1994 | Myllymaki |
| 5,629,687 | A * | 5/1997 | Sutton et al. ............. 340/6.11 |
| 5,923,731 | A * | 7/1999 | McClure ................... 379/33 |
| 6,204,760 | B1 * | 3/2001 | Brunius .................... 340/529 |
| 7,106,193 | B2 | 9/2006 | Kovach |
| 7,174,176 | B1 * | 2/2007 | Liu .......................... 455/462 |
| 7,675,402 | B2 * | 3/2010 | Lee et al. ................. 340/5.54 |
| 2002/0107036 | A1 * | 8/2002 | Cannon et al. ........... 455/462 |
| 2002/0163997 | A1 * | 11/2002 | Bergman et al. ......... 379/37 |
| 2003/0013503 | A1 * | 1/2003 | Menard et al. ........... 455/569 |
| 2004/0086091 | A1 * | 5/2004 | Naidoo et al. ........... 379/37 |
| 2006/0145842 | A1 * | 7/2006 | Stilp ........................ 340/539.22 |
| 2006/0239250 | A1 * | 10/2006 | Elliot et al. .............. 370/352 |
| 2009/0323904 | A1 * | 12/2009 | Shapiro et al. .......... 379/39 |

\* cited by examiner

US 9,049,307 B2

WIRELESS INTERFACE DEVICE ALLOWING A RELIABLE DIGITAL AND AUDIO COMMUNICATION TRANSFER BETWEEN A SECURITY SYSTEM, POTS AND/OR IP NETWORK MODEM DEVICE

FIELD OF INVENTION

The present invention relates generally to security systems between a premise security system and a central monitoring service, and in particular to a security system supporting digital and audio communications.

BACKGROUND OF THE INVENTION

Currently, various types of security systems are employed in both residential and business locations where a control panel sends signals containing an alarm or other status reporting information to a central monitoring station. The central monitoring station acts as the link between a home or business and police, fire, and other emergency response authorities. In addition, premise security systems now include the ability to allow two-way voice communication between a control panel and the central monitoring station.

To support these applications, the infrastructure of a conventional security system typically includes a control panel, which includes one of the following possible communication modules to communicate with the central monitoring station: (1) a traditional plain old telephone system (POTS) communication module to access the public switched telephone network (PSTN), (2) a wireless RF communication module to access a digital cellular or digital personal communications service (PCS) network, or (3) an IP communication module to access the Internet. In a conventional security system employing a POTS Dialer module, alarm and/or other status reporting information are reported to the central monitoring station by way of the PSTN network. During the reporting period, two-way voice communication between a control panel and the central monitoring station is possible since the POTS line is in use (a channel which allows transmitting digital status report and handle 2 way voice audio communication). When POTS line are used, physical wires are required between the control panel and a telephone jack thus resulting in an increase in the installation time and costs as well as limiting the placement of the control panel within the premise.

In a conventional security system employing traditional alarm communications protocol alarm and/or status data transfer is not reliable via the current voice over global system mobile communication (GSM) network. This is because GSM providers fail to reliably transfer dual tone multi-frequency (dtmf) oriented digital reports due to latency and timing changes introduced by inferior telecommunications equipment. The only reliable alarm reporting is limited to the digital portion of the GSM's general packet radio services (GPRS) channel, which does not allow traditional analog 2-way voice communication.

In a conventional security system employing a POTS digital dialer communication module, the analog port on the modem of a VOIP communication path is utilized for transmitting digital alarm and/or status reports and two-way voice audio communication. However, some VoIP providers do not allow reliable alarm or other status information reporting and voice communications between the control panel (or keypad) and the central monitoring station. This is because VOIP providers fail to reliably transfer dual tone multi-frequency (dtmf) oriented digital reports due to latency and timing changes introduced by inferior telecommunications equipment.

Hence, there is a need for an apparatus, system and/or process employed in premise security systems to allow a reliable method to deliver alarm and/or status reports) and also establish 2 way voice communication link between a control panel and the central monitoring station. Also, in some instances it may be desirable to also have an apparatus, system and/or process, which support both digital and two-way voice communications simultaneously. Moreover, it is desirable to achieve this communications goal wirelessly between the control panel and the POTS line, the analog port on the VoIP modem and/or both IP and Analog port, in order to remove the need for running a physical wire between the control panel and these mediums.

SUMMARY OF THE INVENTION

The present invention provides a system for interfacing digital and audio communications in a security system.

Specifically, the present invention provides a system for interfacing digital and audio communications in a security system, comprising a control panel having one or more first radio transceivers and one or more remote alarm sensors coupled to the control panel, the control panel receiving one or more digital reports from each one or more remote alarm sensors, a wireless interface device having one or more second radio transceivers for receiving one or more digital reports from the control panel, one or more telephone devices coupled to the wireless interface device for communicating with a plain old telephone system (POTS), and an IP network modem device coupled to the wireless interface device and an IP network, wherein, the wireless interface device includes a communication processing device for controlling a transmission of one or more digital reports to a monitoring service via the IP network and for establishing a two-way voice communication between the control panel and the monitoring service and for establishing two-way voice communication between the control panel and the wireless interface device.

The communication processing device is locally controlled or remotely via a monitoring service.

The communication processing device is adapted for disconnecting each one or more telephone devices from a voice connection and seizes the voice connection as required either while sending one or more digital reports or while establishing the two-way communication between the control panel and the monitoring service.

One or more first and second radio transceivers provides digital and audio communications via a WiFi, a Bluetooth™ or a Zibee radio standard.

The security system can further comprises an IP router disposed between the IP network modem device and the wireless interface device.

Alternatively, a wireless interface device for communicating digital and audio communications in a security system is provided comprising, one or more radio transceivers for establishing two-way voice communication between the wireless interface device and a control panel, a first port for transmitting one or more digital reports to a monitoring service via an IP network, a second port for receiving and transmitting two-way voice communications, a third port for connection one or more telephones to the wireless interface device, and a communication processor for controlling the transmitting of the one or more digital reports via the IP network and transmitting and receiving two-way voice communications and for interfacing the control panel and the monitoring service.

Alternatively, a wireless interface device for communicating digital and audio communications in a security system, comprising, one or more radio transceivers for establishing two-way voice communication between the wireless interface device and a control panel, a first port for transmitting one or more digital reports and transmitting two-way voice communications on a plain old telephone system (POTS) phone line, a second port for connection one or more telephones to the wireless interface device, and a communication processor for controlling the transmitting and receiving the digital reports over POTS and transmitting and receiving two-way voice communications and for interfacing the control panel and a monitoring service.

Alternatively, a wireless interface device for communicating digital and audio communications in a security system, comprising, one or more radio transceivers for establishing two-way voice communication between the wireless interface device and a control panel, a first port for transmitting one or more digital reports and transmitting two-way voice communications via an analog port of a broadband modem, a second port for connection of one or more telephones to the wireless interface, and a communication processor for controlling the transmitting and receiving the digital reports over the analog port of the broadband modem and transmitting and receiving two-way voice communications and for interfacing the control panel and a monitoring service.

The present invention also provides a method of interfacing digital and audio communications in a security system, comprising the steps of sending one or more digital reports from one or more remote sensors in the security system to a control panel at a predetermined interval, re-sending wirelessly the received one or more digital reports to a wireless interface device, the wireless interface device coupled to an IP network for forwarding the one or more digital reports to a monitoring service, receiving by the wireless interface device a two-way voice communication request from the monitoring service, and establishing two-way voice communication between the control panel and the monitoring service.

Alternatively, while performing the step of re-sending wirelessly the received one or more digital reports to a wireless interface device, the wireless interface device is not coupled to an IP network modem device and instead coupled directly to a plain old telephone system (POTS) phone line via a rj31x jack.

Alternatively, A system for interfacing digital and audio communications in a security system, comprising, a control panel having one or more first radio transceivers and one or more remote alarm sensors coupled to the control panel, said control panel receiving one or more digital reports from each the one or more remote alarm sensors, a wireless interface device having one or more second radio transceivers for receiving the one or more digital reports from the control panel, one or more telephone devices coupled to the wireless interface device for communicating with a plain old telephone system (POTS), and a plain old telephone system (POTS) phone jack coupled to the wireless interface device and an public switched telephone network (PSTN), wherein, the wireless interface device includes a communication processing device for controlling a transmission of the one or more digital reports to a monitoring service via said PSTN and for establishing a two-way voice communication between the control panel and the monitoring service and for establishing two-way voice communication between the control panel and the wireless interface device.

The monitoring service can locally or remotely controls the communication processing device.

The communication processing device is adapted for disconnecting each said one or more telephone devices from a voice connection and seizes said voice connection as required either while sending said one or more digital reports or while establishing said two-way communication between said control panel and said monitoring service.

An additional object of the present invention is to provide a program storage device readable by a machine, tangibly embodying a program of instructions executable by the machine to perform the above-described method for interfacing digital and audio communications in a security system.

An additional object of the present invention is to provide a wireless means to improve installation speed by removing the necessity for running a physical wire (such as a phone line or cat5 cable) between the control panel and the point of entry of this communication medium, either POTS and/or IP via broadband modem.

The invention is further described in the detailed description that follows, by reference to the noted drawing by way of non-limiting illustrative embodiments of the invention, in which like reference numerals represent similar parts throughout the drawings. As should be understood, however, the invention is not limited to the precise arrangements and instrumentalities shown.

DETAILED DESCRIPTION OF THE DRAWINGS

These and other features, benefits and advantages of the present invention will become apparent by reference to the following text figures, with like reference numbers referring to like structures across the views, wherein.

DISCLOSURE OF THE INVENTION

Figure 1A:
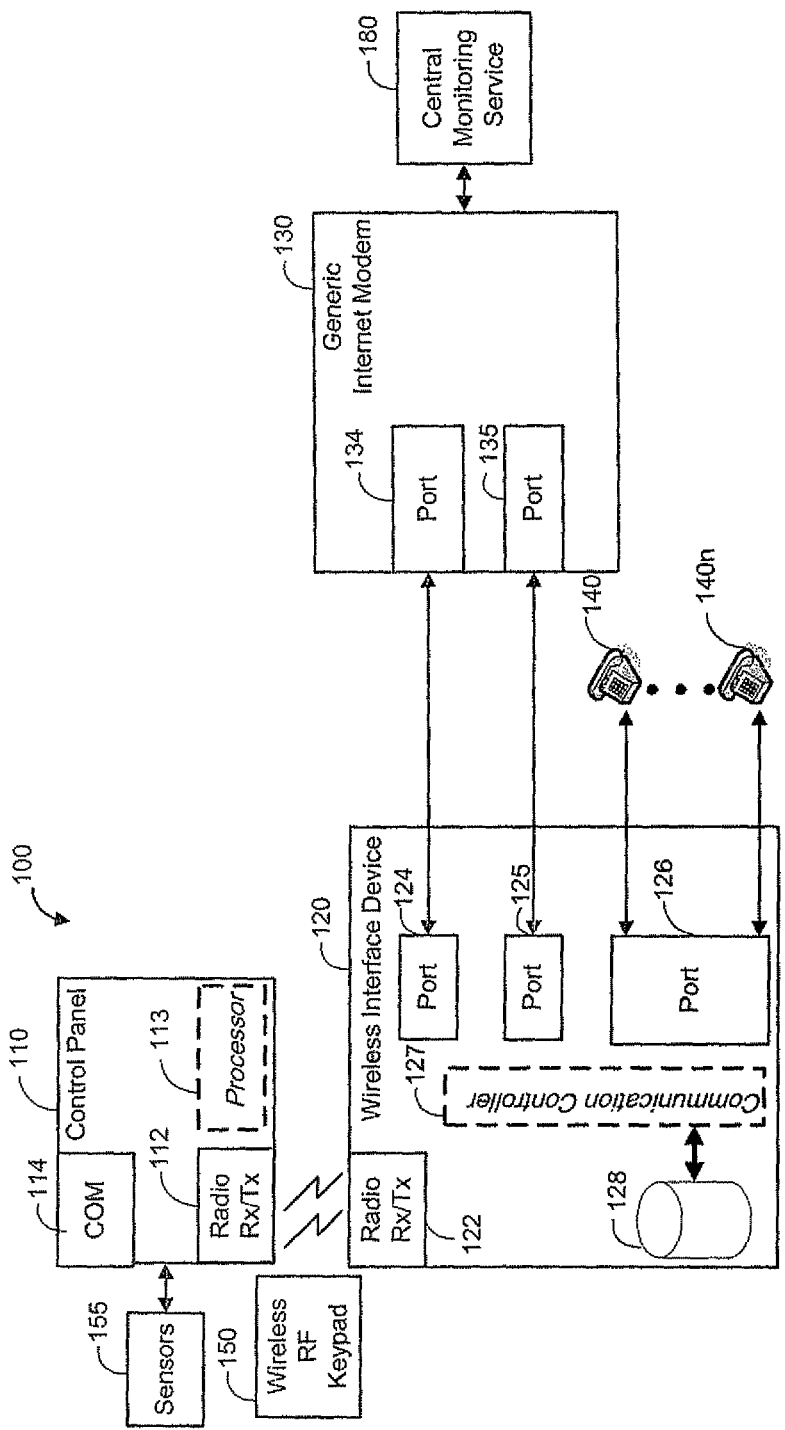
FIG. 1A depicts a system for interfacing digital and audio communications in a security system according the first embodiment of the present invention.

FIG. 1A shows an exemplary embodiment of the system for interfacing digital and audio communications in a security system of the present invention. In the FIG. 1, a wireless interface device 120 is wirelessly coupled to a control panel 110 and a generic Internet modem 130. Control panel 110 is wired or wirelessly coupled to various types of sensors 155, such as motion, smoke or heat sensors and at least one keypad 150.

As known to those skilled in the art, control panel 110 may additionally include a built-in microphone and speaker (not shown) as well as support circuitry for the purpose of annunciating all human voice discussions (listening and talking) between on-premise persons (typically the homeowner) and the central monitoring operators. This ensures that central monitoring operators can listen to events as they transpire on-premise during the commission of a crime, or other emergency. Additionally the microphone circuitry allows on-premise persons the ability to communicate back to the central station operator. Further, the control panel 110 may support an additional 2 way voice standalone station, either wired or wireless via COM port 114 for this same purpose as discussed above (voice discussions during a 2 way voice session between operator and on-premise persons).

The status of the alarm or security system is maintained in storage (not shown) in the control panel 110. Periodic status event reports and alarm reports are generated by a processor 113 (microprocessor/controller, or FPGA, or the like) in digital format for example, Full Contact ID or ADEMCO high-speed reporting formats. Other digital alarm reporting formats can be utilized by the present invention as known to those skilled in the art.

Communications between the control panel 110 and the wireless interface device 120 are wireless by means of radio transceivers 112 and 122. Such emerging radio standards as WiMax™, WiFi, ZiBee, Bluetooth™ and the like can be utilized for communications as well as others known in the art. As known to those skilled in the art, radio transceiver 112 can be either an integral part of the control panel 110 (e.g. couple to PCB), or it could be a standalone module which is either mounted on a control panel PCB, or mounted inside a common enclosure with the control panel 110 but a separate PCB. In addition, radio transceiver 112 could be mounted on a PCB outside a control panel enclosure.

Figure 1B:
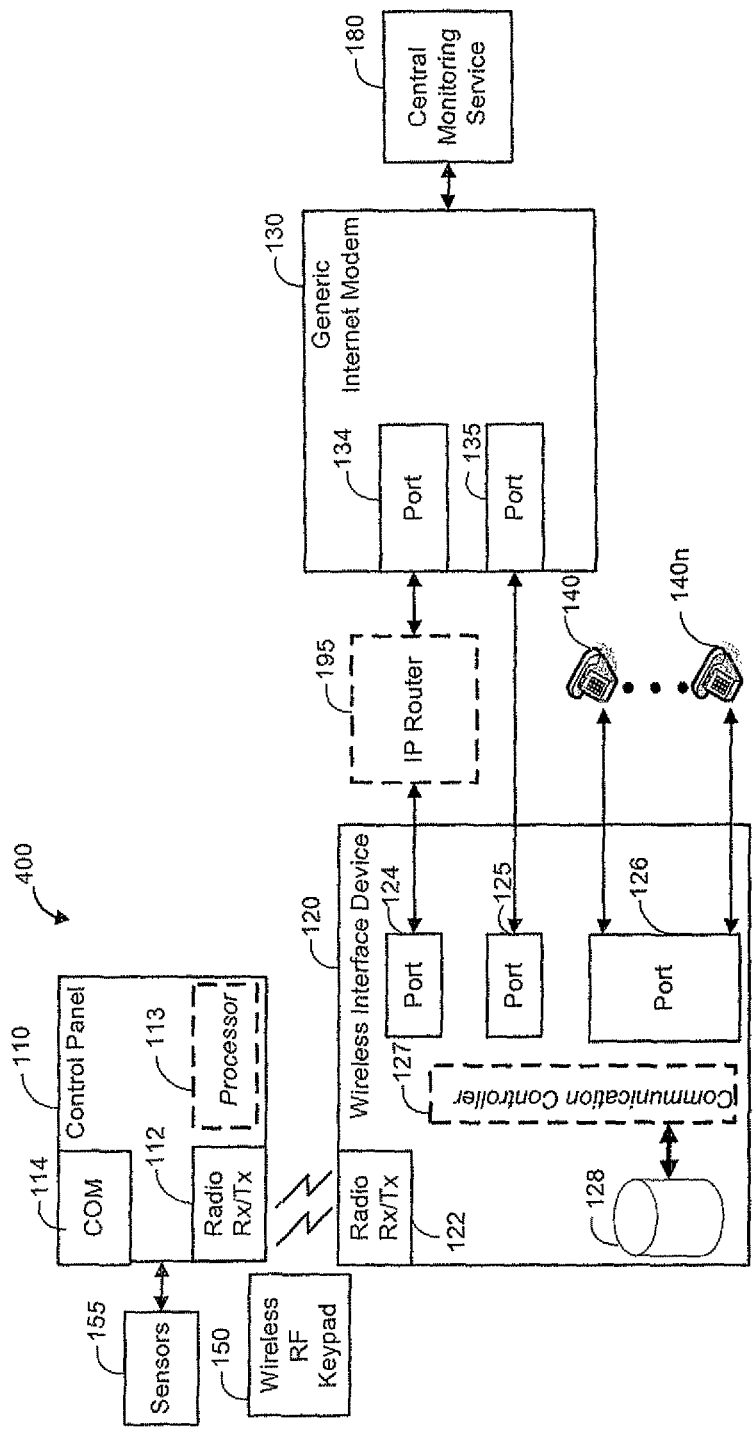
FIG. 1B depicts a system for interfacing digital and audio communications in a security system according the second embodiment of the present invention.

Generic Internet modem 130 is a generic Internet modem, which can access the Internet, such as a DSL modem which connects via an IP network port (not shown) and as an rj45 patch or via a fiber optics connection. Alternatively, generic Internet modem 130 can be a cable modem accessible to the Internet via a co-axial cable connection cable, or generic Internet modem 130 can be a WiMax antenna or the like capable accessing the Internet via a hot spot as known to those skilled in the art. As shown in FIG. 1B, an alternative embodiment of the present invention according to a second embodiment 400 includes an optional IP router 195 may be disposed between the generic Internet modem 130 and wireless interface device 120. In some DSL and cable modems, a plain old telephone service (POTS) port connection 135 can be provided for interfacing the generic Internet modem 130 with a public switched telephone network (PSTN) (not shown). The POTS and PSTN are merely one possible embodiment of the invention. Those skilled in the art could alternatively employ an emerging voice-over IP connection as known to those skilled in the art. Port 134 is provided for interfacing IP communications between generic Internet modem 130 and Port 124 of the wireless interface device 120. Similarly, Port 135 is provided for interfacing two-way voice communications between generic Internet modem 130 and the wireless interface device 120, Port 125.

Figure 2:
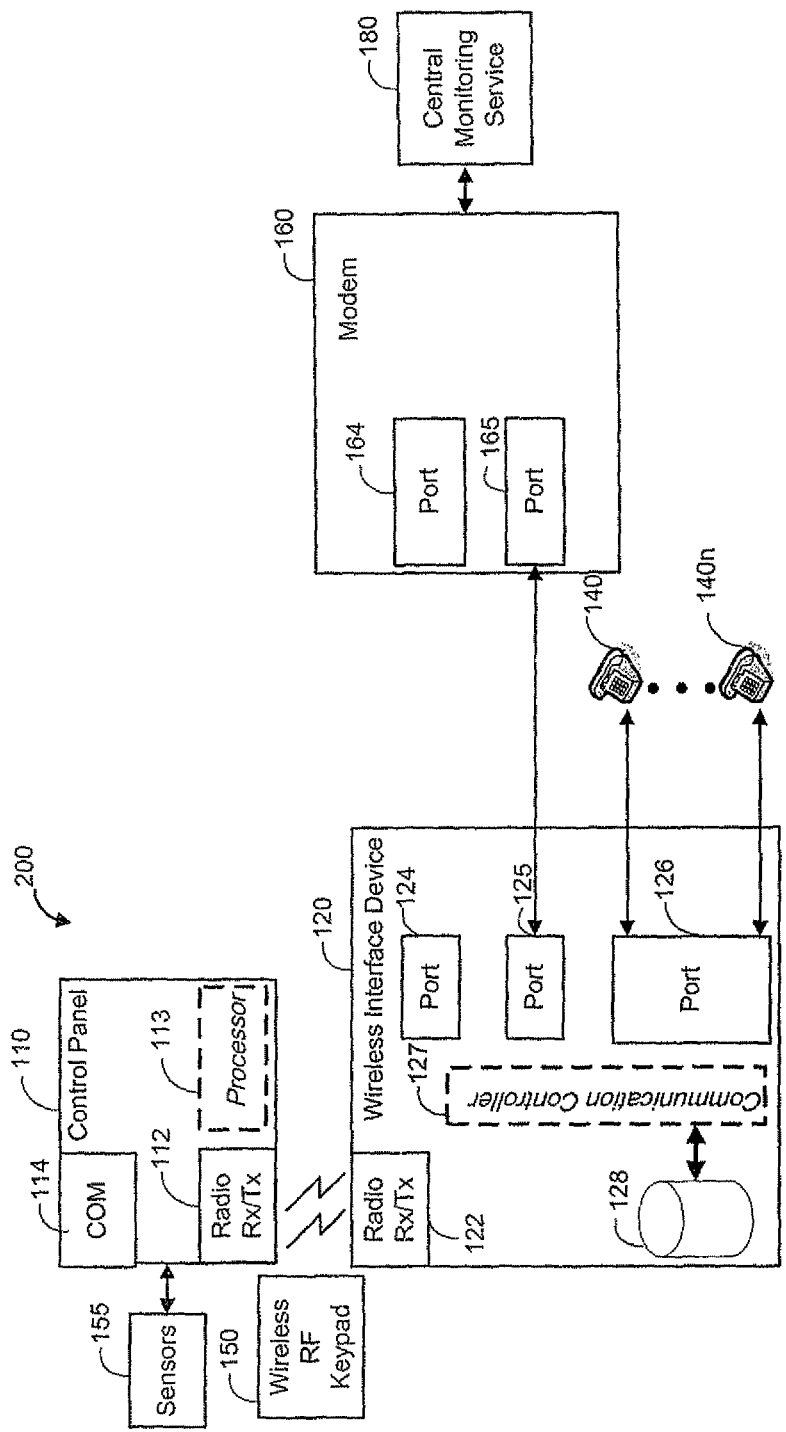
FIG. 2 depicts a system for interfacing digital and audio communications in a security system according third embodiment of the present invention.

Referring now to FIG. 2 a system for interfacing digital and audio communications according to the third embodiment of the present invention is shown. In FIG. 2, modem 160 is provided and is an IP based broadband modem or similar device. In this alternative embodiment, the analog output of Port 125 on wireless interface device 120 is connected directly to the analog Port 165 on modem 160. Moreover, in this alternate configuration the IP Port 164 remains unused for this application and both digital status report (e.g. alarm or trouble reports) and 2 way voice sessions are established via the analog Port 165. It should be noted that modem 160 is a duplicate of generic Internet modem 130 described above. However, in Modem 160 the IP port 164 is unused and all communications occurs on the analog Port 165. This alternate configuration eliminates running wires between the control panel 110 and modem 160 and achieves 2-way voice wirelessly.

Figure 3:
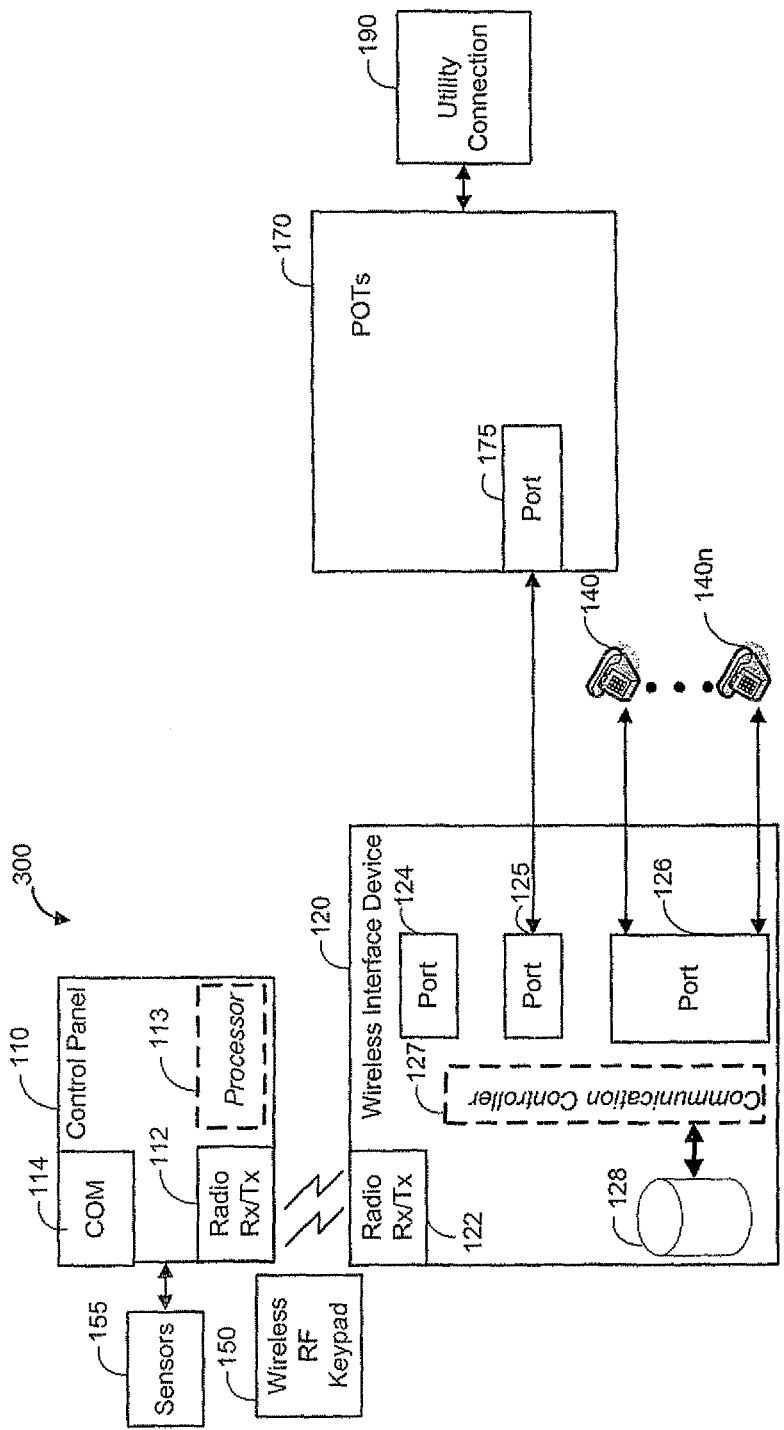
FIG. 3 depicts a system for interfacing digital and audio communications in a security system according the forth embodiment of the present invention.

Referring now to FIG. 3 a system for interfacing digital and audio communications according to the fourth embodiment of the present invention is shown. In FIG. 3, POTS device 170 is provided which is an rj31x jack or similar POTS line connection device where the analog output of port 125 on wireless interface device 120 is connected directly to Port 175 on POTS device 170 and to the street via a utility connection 190. POTS device 170 also connects directly to any on-premise incoming POTS line. Both digital status reports (e.g. alarm or trouble reports) and 2 way voice sessions are established via this medium. This alternate configuration eliminates running wires between the control panel 110 and the POTS device 170.

Referring back to FIG. 1A the operation of the first embodiment of the present invention will now be described. As shown in FIG. 1A, wireless interface device 120, Port 126 is provided for interfacing the POTS and a plurality of telephones 140-140n. A communication controller 127 is provided for controlling the timing and switching between reporting the digital reports generated by processor 113 in the control panel 110 and the establishment of two-way communication between the central monitoring service 180 and control panel 110. For example, in one instant, a RF signal (originated at control panel 110) is transmitted by RF radio transceiver 112 to the wireless interface 120 via RF radio transceiver 122. The communication controller 127 upon receipt of the digital report transmits the report via IP by way of Port 124 of the wireless interface device 120 to Port 134 of the generic Internet modem 130 via a path cable. The digital reports are temporarily storage in memory 128. The central monitoring service 180 receives the digital report via an IP network such as the Internet from the generic Internet modem 130.

In the event of an alarm report, the central monitoring service 180 may initiate two-way voice with control panel 110. That is, the central monitoring service 180 may send a control signal to the communication controller 127 in response to an alarm report via the POTS and/or IP network. Various call back scheme can be employed as known to those skilled in the art such as a generalize call back scheme or a call back scheme triggered by a specific event code reported (e.g. contact ID format). The present invention is not limited to any specific call back scheme.

Next, a control signal sent from the central monitoring service 180 would trace back through the generic Internet modem 130 to the wireless interface device 120 via IP by way of port 134 to port 124 via a path cable. The communication controller 127 will in response to the control signal seize the POTS connection, which will have the effect of disconnecting telephones 140-140n from the POTS and send an ACK signal back to the central monitoring service 180. At the same time communication controller 127 will also send a second control signal to processor 113 in the control panel 110 via RF radio transceivers 122 to RF radio transceiver 112. The second control signal will establish a communication channel between the control panel 110 or a keypad attached to the control panel 110 (e.g. wireless keypad 150) to allow the transferring of audio communications to port 125 of the wireless interface device to port 135 of the generic Internet modem 130 thereby providing an audio path from the central monitoring station which initiated the requested audio communication (two-way voice communication).

The method of interfacing digital and audio communications in an alarm or security system according to the first embodiment of the present invention comprises the following four steps. First, one or more digital reports are sent from one or more remote sensors 155 to control panel 110 at a predetermined interval. As noted above these digital reports are periodic status event reports and alarm reports generated by a processor 113 in control panel 110 in a digital report format. The second step requires that the communication controller 127 send via IP each digital report received by the wireless interface device 120 from the control panel 110 via an IP network to a central monitoring service 180.

In the third step, the central monitoring service 180 sends a control signal to wireless interface device 120 to establish two-way voice communication which the communication processor 127 acknowledges so that voice communications may be established between the generic Internet modem 130 and the wireless interface device 120 via analog port 125 on wireless interface device 120, and analog port 135 on generic interne modem 130 and the control panel 110 via RF radio transceivers. The communication processor 127 is remotely controlled by the central monitoring service 180.

The present invention provides an apparatus, system and/or process employed in a premise alarm and security systems to supports both digital and audio communications. In particular, digital reports are transmitted via an IP network and two-way voice communications via the audio section of the IP or via POTS allowing a reliable method to deliver status report (e.g. alarm or trouble report etc) and also establishing 2-way voice communication between a control panel 110 and the central monitoring service 180. Moreover, the present invention eliminates the need for wires between the control panel 110 and an Internet modem 130 while providing reliable status and alarm reporting to a central monitoring service 180.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

As will be readily apparent to those skilled in the art, the method of interfacing digital and audio communications of the invention can be realized in hardware, or as some combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

Moreover, the present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

What is claimed is:

1. A system for interfacing digital and audio communications in a security system, comprising:
   a control panel within a premises of a premises owner, the control panel having one or more first radio transceivers and one or more remote alarm sensors coupled directly to said control panel, said control panel receiving one or more digital reports from each said one or more remote alarm sensors;
   a wireless interface device within the premises, the wireless interface device having one or more second radio transceivers that receive said one or more digital reports directly from said control panel and that establish a two-way voice connection between said control panel and said wireless interface device;
   one or more telephone devices within the premises, the one or more telephone devices coupled to said wireless interface device that communicate with a plain old telephone system (POTS); and
   an IP network modem device within the premises, the IP network modem device coupled to said wireless interface device and an IP network,
   wherein, said wireless interface device includes a communication processing device that controls a transmission of said one or more digital reports to a monitoring service via said IP network and that establishes a two-way voice communication between the premises through said control panel and said monitoring service in response to a control signal from said monitoring service regarding an alarm report of any of said one or more digital reports received through the wireless interface device and wherein the wireless interface device establishes two-way voice communication between said control panel and said wireless interface device through the first and second radio transceivers.

2. The system in claim 1, wherein said monitoring service remotely controls said communication processing device.

3. The system in claim 2, wherein said communication processing device is adapted for disconnecting each said one or more telephone devices from a voice connection and seizes said voice connection as required either while sending said one or more digital reports or while establishing said two-way communication between said control panel and said monitoring service.

4. The system in claim 3, wherein said security system further comprises:
   an IP router disposed between said IP network modem device and said wireless interface device.

5. The system of claim 1, wherein said one or more first and second radio transceivers provides said digital and audio communications via a WiFi, a Bluetooth™ or a Zigbee radio standard.

6. A wireless interface device within a premises of a premises owner for communicating digital and audio communications in a security system of the premises, comprising:
   one or more radio transceivers that establishes direct two-way voice communication between said wireless interface device within the premises and a control panel within the premises and that transfers one or more digital reports from the control panel to said wireless interface device;
   a first port that transmits one or more digital reports received from the control panel to a monitoring service via an IP network;

a second port that receives and transmits two-way voice communications;

a third port that connects one or more telephones to said wireless interface device; and a communication processor that controls the transmitting of said one or more digital reports via said IP network and transmitting and receiving two-way voice communications and that interfaces said control panel and said monitoring service, wherein the communication processor initiates the transmitting and receiving of the two-way communications between the premises through said control panel and said monitoring service in response to a control signal from the monitoring service regarding an alarm report of any of the one or more digital reports received through the wireless 7. The wireless interface device of claim 6 wherein said communication processor is remotely controlled by said monitoring service.

8. The wireless interface device of claim 7, wherein said communication processor disconnects each said one or more telephones from a voice connection and seizes said voice connection for establishing said two-way communication between said control panel and said monitoring service. interface device.

9. A wireless interface device within a premises of a premises owner for communicating digital and audio communications in a security system of the premises, comprising:
one or more radio transceivers that establishes direct two-way voice communication between said wireless interface device and a control panel within the premises and that transfers one or more digital reports from the control panel to the wireless interface device;

a first port that transmits the one or more digital reports received from the control panel and transmits and receives two-way voice communications on a plain old telephone system (POTS) phone connection;

a second port that connects one or more telephones to said wireless interface device; and a communication processor that controls the transmitting of said one or more digital reports over POTS and transmitting and receiving two-way voice communications and that interfaces said control panel and a monitoring service wherein the communication processor initiates the transmitting and receiving of the two-way communications between the premises through said control panel and said monitoring service in response to a control signal from the monitoring service regarding an alarm report of any of the one or more digital reports received through the wireless interface device.

10. The wireless interface device of claim 9 wherein said communication processor is remotely controlled by said monitoring service.

11. The wireless interface device of claim 10, wherein said communication processor disconnects each said one or more telephones from a voice connection and seizes said voice connection for establishing said two-way communication between said control panel and said monitoring service.

12. A wireless interface device within a premises of a premises owner for communicating digital and audio communications in a security system of the premises, comprising:
one or more radio transceivers within the premises that establishes direct two-way voice communication between said wireless interface device and a control panel within the premises, the transfers one or more digital reports from the control panel and said wireless interface devices and that establishes a two-way voice connection between the control panel and the wireless interface device;

a first port that transmits the one or more digital reports from the control panel and that transmits and receives two-way voice communications via an analog port of a broadband modem;

a second port that connects one or more telephones to said wireless interface; and a communication processor that controls the transmitting said one or more digital reports over the analog port of said broadband modem and transmitting and receiving two-way voice communications and that interfaces said control panel and a monitoring service wherein the communication processor initiates the transmitting and receiving of the two-way communications between the premises through said control panel and said monitoring service in response to a control signal from the monitoring service regarding an alarm report of any of the one or more digital reports received through the wireless interface device.

13. The wireless interface device of claim 12 wherein said communication processor is remotely controlled by said monitoring service.

14. The wireless interface device of claim 13, wherein said communication processor disconnects each said one or more telephones from a voice connection and seizes said voice connection for establishing said two-way communication between said control panel and said monitoring service.

15. A method of interfacing digital and audio communications in a security system within a premises of a premises owner, comprising the steps of:
(1) sending one or more digital reports from one or more remote sensors within the premises of said security system to a control panel within the premises at a predetermined interval;
(2) re-sending wirelessly said received one or more digital reports to a wireless interface device within the premises, said wireless interface device coupled to an IP network for forwarding said one or more digital reports to a monitoring service;
(3) receiving by said wireless interface device a two-way voice communication request from said monitoring service for two-way communication between the premises owner through the control panel and said monitoring device; and
(4) establishing two-way voice communication between said control panel and said monitoring service through a wireless connection between the control panel and wireless interface device wherein the request for the two-way communications between said control panel and said monitoring service is received in response to an alarm report of any of the one or more digital reports received through the wireless interface device.

16. The method of claim 15, wherein, while performing the step of re-sending wirelessly said received one or more digital reports to a wireless interface device, said wireless interface device is not coupled to an IP network modem device and instead coupled directly to a plain old telephone system (POTS) phone line via a rj31x jack.

17. The method of claim 15, wherein said steps of (2) through (4) are performed by a communication processor, which is remotely controlled by said monitoring service.

18. The method of claim 17, wherein the step (3) further comprising the sub-step of (a) disconnecting by said communication processor, one or more telephone devices coupled to said wireless interface device and seizing a voice connection for establishing said two-way voice communication between said control panel and said monitoring service.

19. The method of claim 15, wherein the step (3) further comprising the sub-step of: (a) disconnecting by said communication processor, one or more telephone devices coupled to said wireless interface device and seizing a voice connection for establishing said two-way voice communication between said control panel and said monitoring service.

20. A program storage device readable by a machine, tangibly embodying a program of instructions executable by the machine to perform a method for interfacing digital and audio communications in a security system within a premises of a premises owner, comprising:
   a process for sending one or more digital reports from one or more remote sensors within the premises of said security system to a control panel within the premises at a predetermined interval;
   a process for re-sending wirelessly said received one or more digital reports to a wireless interface device, said wireless interface device coupled to an IP network for forwarding said one or more digital reports to a monitoring service;
   a process for receiving by said wireless interface device a two-way voice communication request from said monitoring service; and
   a process for establishing two-way voice communication between the premises through said control panel and said monitoring service through the wireless interface and a wireless connection between the control panel and wireless interface device wherein the request for the two-way communications between said control panel and said monitoring service is received in response to an alarm report of any of the one or more digital reports received through the wireless interface device.

21. The program storage device of claim 20, wherein the process of re-sending wirelessly said received one or more digital reports to a wireless interface device, said wireless interface device is not coupled to an IP network modem device and instead coupled directly to a plain old telephone system (POTS) phone line via a rj31x jack.

22. The program storage device of claim 21, wherein said processes are performed by a communication processor, which is remotely controlled by said monitoring service.

23. The method of claim 22, wherein process for re-sending wirelessly said received one or more digital reports to a wireless interface device, further comprising the sub-process of: disconnecting by said communication processor, one or more telephone devices coupled to said wireless interface device and seizing a voice connection for establishing said two-way voice communication between said control panel and said monitoring service.

24. The program storage device of claim 20, wherein said processes are performed by a communication processor, which is remotely controlled by said monitoring service.

25. The method of claim 24, wherein the process for re-sending wirelessly said received one or more digital reports to a wireless interface device, further comprising the sub-process of: disconnecting by said communication processor, one or more telephone devices coupled to said wireless interface device and seizing a voice connection for establishing said two-way voice communication between said control panel and said monitoring service.

26. A system for interfacing digital and audio communications in a security system within a premises of a premises owner, comprising:
   a control panel having one or more first radio transceivers and one or more remote alarm sensors directly coupled to said control panel, said control panel receiving one or more digital reports from each said one or more remote alarm sensors;
   a wireless interface device within the premises having one or more second radio transceivers that directly receives said one or more digital reports from said control panel and that establishes a two-way voice connection between the control panel and the wireless interface device;
   one or more telephone devices coupled to said wireless interface device for communicating with a plain old telephone system (POTS); and
   a plain old telephone system (POTS) phone jack coupled to said wireless interface device and a public switched telephone network (PSTN), wherein, said wireless interface device includes a communication processing device that controls a transmission of said one or more digital reports to a monitoring service via said PSTN and that establishes a two-way voice communication between the premises through said control panel and said monitoring service in response to a control signal from said monitoring service regarding an alarm report of any of said one or more digital reports received through the wireless interface device and said wireless interface devices establishes two-way voice communication between said control panel and said wireless interface device.

27. The system in claim 26, wherein said monitoring service remotely controls said communication processing device.

28. The system in claim 27, wherein said communication processing device is adapted for disconnecting each said one or more telephone devices from a voice connection and seizes said voice connection as required either while sending said one or more digital reports or while establishing said two-way communication between said control panel and said monitoring service.

29. The system of claim 26, wherein said one or more first and second radio transceivers provides said digital and audio communications via a WiFi, a Bluetooth™ or a Zigbee radio standard.

* * * * *